May 31, 1960 F. E. STEDMAN ET AL 2,938,790
FRICTION LINING COMPOSITIONS
Original Filed Nov. 8, 1955 2 Sheets-Sheet 1

INVENTOR.
FRANCES E. STEDMAN
ROBERT C. POCOCK
BY
Chas. M. Funkhouser
ATTORNEY

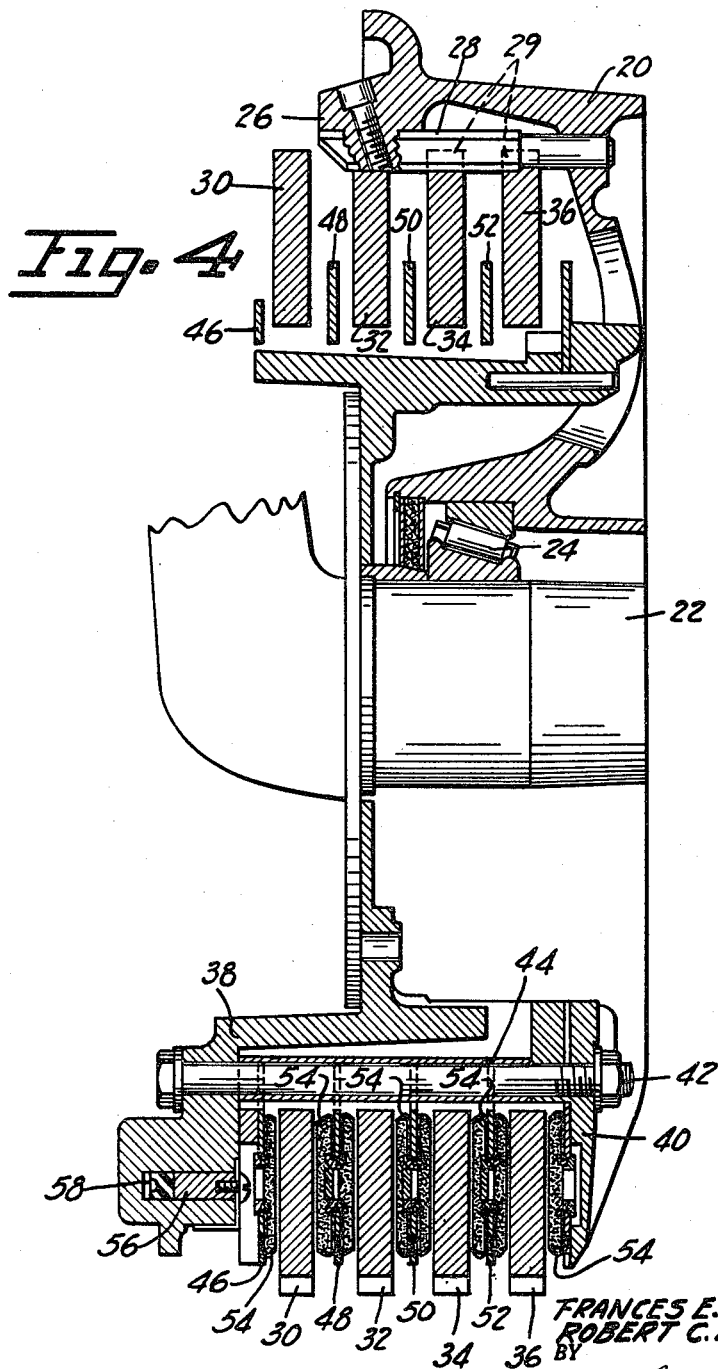

United States Patent Office 2,938,790
Patented May 31, 1960

2,938,790

FRICTION LINING COMPOSITIONS

Frances E. Stedman and Robert Clifton Pocock, South Bend, Ind., assignors to Bendix Aviation Corporation, South Bend, Ind., a corporation of Delaware Original application Nov. 8, 1955, Ser. No. 545,637, now Patent No. 2,784,105, dated Mar. 5, 1957. Divided and this application Jan. 25, 1957, Ser. No. 640,622

8 Claims. (Cl. 75—206)

The present invention relates to the art of friction compositions for use in clutch and brake devices, or the like. The invention is particularly useful in high kinetic-energy-absorbing devices, but also finds application in low kinetic-energy-absorbing devices.

This a division of our copending application, Serial No. 545,637, filed November 8, 1955, now Patent No. 2,784,105, issued March 5, 1957, and which, in turn, is a continuation-in-part of our copending application, Serial No. 257,162, filed on November 19, 1951, and now abandoned.

Friction composition lining or segments may be characterized as falling generally within two categories, namely, organic and inorganic. Organic linings are almost universally used on automotive vehicles and are used to an appreciable extent on aircraft. Inorganic friction materials (other than solid metals) have not as yet found widespread use in the brake and clutch art, and the reason is believed to be primarily the instability of the frictional properties over the desired wear-life of the friction article. One major deficiency of prior art friction articles resides in the reduction of the coefficient of friction after a number of high temperature service applications have been made, and this obviously is undesirable because the performance is directly dependent upon the frictional properties of the articles.

In the past, it has been considered desirable in a prime friction material used in inorganic friction articles that the material be of abrasive character and have strength to prevent its breaking away during service use. Materials considered to fulfill these requirements have included silica, clay, carborundum, and aluminum oxide. Suffice it to say for the present, these enumerated materials are deficient in certain respects and are, therefore, not regarded as satisfactory.

Therefore, it is a principal object of this invention to provide a friction composition which possesses a relatively stable or desirable coefficient of friction throughout its wear-life on the clutch, brake, etc. A further object is to provide such a friction lining composition which, by reason of resistance to high temperatures, is especially suited for use in heavy duty applications. A still further object is to provide a friction composition or article in which mullite is utilized as a principal friction-producing agent in the braking or clutching operation. A still further object is to provide a friction composition which will maintain substantially uniform friction-producing surfaces after repeated operations under high temperature conditions and in heavy duty applications. For example, aircraft brakes, when applied, are heated to extremely high temperatures in a matter of a few seconds, and current demands are such that the capacities of many friction compositions have been materially exceeded. Consequently, a new, more rugged, material is needed for such conditions, and it is a further object of this invention to fulfill this need.

Other objects will become apparent as the description proceeds. In the drawings:

Figure 4 is a sectional illustration of a disc brake incorporating an embodiment of this invention.

Figure 1:
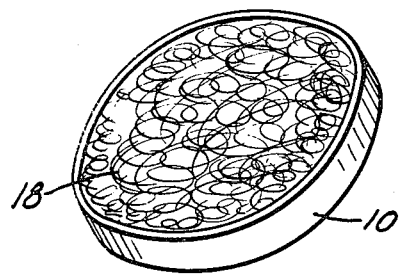
Figure 1 is a perspective illustration of a friction article incorporating the present invention.

Broadly, the product which we have invented is a friction material composition or article which is suitable for use as a brake or clutch lining (or the like) and which contains an inorganic material known as mullite and a suitable binder material, together, in some instances, with other ingredients.

We have discovered that mullite, or a frangible material containing mullite, such as calcined kyanite, etc., when retained by a suitable binder, is effective as a friction material because the grain of mullite tends to wear under use and to present new or renewed frangible apices which provide effective friction-producing surfaces. Any binder which is effective for retaining the mullite grains in friction-producing position while allowing wear of the grains to produce the new frangible apices, may be employed. However, where the mullite grains are to be used to the maximum advantage, particularly under high temperature conditions or in high kinetic-energy-absorbing devices, it is desirable to use metallic binders, which are both more heat resistant than most other binders and more effective in retaining the mullite grains in the friction article.

In one form of this invention, the binder consists of a strong, heat-resistant, wear-resistant, ductile, malleable metallic substance which is combined with the prime friction material, identified above as mullite, so as to support the mullite in friction-producing position so that wear of the mullite brings about renewed or new frangible apices within the mullite grains. In such a friction article, copper and a heat-treated aluminum silicate in which mullite is predominant may constitute the principal ingredients, and an example formulation containing these ingredients may consist as follows in approximate percentages by weight: Copper 16% to 86%, zinc and/or tin in amounts up to 41%, and calcined kyanite (which is predominately mullite) 1% to 55%. Test results indicated that with certain binders up to 70% of calcined kyanite may be used, this being the equivalent of about 60% of mullite. While amounts of calcined kyanite as low as 1% are believed to be beneficial to the friction material, outstanding advantages over other prime friction-producing ingredients are clearly indicated by test results of compositions using as little as 4% of calcined kyanite or 3% of mullite.

Under certain conditions, the zinc and tin may be entirely eliminated or used interchangeably in any desired proportions up to the specified 41%. Other ingredients such as nickel, cobalt, iron, and brass may be substituted for the copper. In addition, the composition may contain any one or more of the constituents: lead 1% to 20%, flake graphite 1% to 19%, or silica 1% to 20%. Iron may be substituted for the copper or may be added to the copper-containing composition in amounts ranging from 1% to 38%. When used as a substitute for copper, the iron is sintered and forms a continuous metallic phase, but when used with a matrix with which it does not alloy, such as copper, it acts as a friction modifying ingredient.

Various formulae within the specified ranges have been found to produce articles suitable for brake or clutch use, the articles having desirable friction, wear, and strength characteristics. The calcined kyanite (or similar material as explained hereafter) is the primary friction-producing ingredient, and should be used in sufficient quantity to obtain the desired coefficient of friction. The minimum useful amount of calcined kyanite (or mullite) depends upon the performance characteristics which need to be attained. The maximum useful amount of calcined kyanite (or mullite) depends largely upon the characteristics of the matrix (or binder).

In the form of the invention just described, the important elements are mullite and a strong metallic binder serving to retain said mullite in position. In effect, the frictional composition comprises a metallic matrix having a plurality of pores distributed throughout its mass, and particles of mullite disposed in said pores, said matrix serving to positively secure said mullite in position with respect to the mass of said matrix. The proportions of mullite are not critical, the mullite giving its effective friction-producing action in any quantity used. The primary function of the binder metal or other material is to form around the mullite grains and mechanically hold them in position so that fracture occurs within the grains and without pulling the grains out of the binder material. This is best accomplished by employing a plastically deformable binder which retains the mullite with sufficient tenacity so that wear of the friction composition creates new frangible apices within the mullite grains and without fracture between the binder and the grains.

As stated, use of the calcined kyanite (or mullite) is largely responsible for the excellent wear-resistance of our improved friction lining. Therefore, it is necessary to use enough calcined kyanite (or mullite) to obtain the desired low wear rate. Obviously, if the amount of ceramic material (and other non-binder constituents) is too high, the amount of metallic binder (for example, copper) will be insufficient to prevent crumbling of the lining, i.e., the lining becomes deficient insofar as internal strength is concerned. This need for an adequate amount of binding (or matrix) material is the primary limiting factor determining the usable amount of ceramic material. Different binding materials, because of their variant characteristics as binders, permit different maximum amounts of ceramic material to be incorporated in the lining.

The optimum ratio of metallic matrix to primary friction-producing ceramic (calcined kyanite or mullite) is dependent upon the particular usage of the friction material. Once a particular usage of the friction material is selected, it then becomes possible to select the ratio of matrix to ceramic which is best adapted to the conditions encountered in the desired application. The upper limit of ceramic is determined by the ability of the metallic matrix to form a cohesive compact. Physical properties such as wear rate and effectiveness (or coefficient of friction) are influenced by a change in the ceramic content. Assuming that the proposed usage of the material dictates a high ceramic content, then such a material can be fabricated, the only limitation being that the matrix must have sufficient strength to retain the ceramic material in position under operating conditions.

It has been discovered that the various matrix ingredients differ in their capacity to hold the material together. Since the matrix ingredients also have an influence on the effectiveness and wear rate of the material, the selection of the matrix ingredients is both on the basis of the amount of ceramic required and on the basis of the friction and wear characteristics of the matrix itself. It is, therefore, apparent that the choice of the ceramic-to-matrix ratio is a matter of design preference. The formulating of friction materials for specific uses proceeds on the theory that there is no given formulation which is superior at all performance conditions.

The strength of the article must be sufficient to withstand the shear loads encountered by conventional friction lining materials and must be sufficient to prevent undue tearing and falling away with successive service applications. The strength is primarily due to the metallic binder. While the use of insufficient metallic binder reduces the strength of the lining, the use of excessive metallic binder tends to produce a fast-wearing product. The amount and constituency of the binder should not under any circumstances be such as to suppress the frictional characteristics of the mullite or dominate the frictional properties of the lining.

The zinc and/or tin may be used to change the friction characteristics of the matrix by alloying with it and also may be used as lubricants when present as unalloyed constituents. If used in excessive amounts, they tend to produce a low-melting article having obvious limitations for service use.

Since carbonaceous lubricants tend to detract from matrix strength, in those instances where high concentrations of ceramic are desired the graphite or other carbonaceous lubricant may be entirely eliminated. There is, of course, a loss in whatever effect is provided by the lubricant, but this can be compensated for through appropriate matrix formulation. Also, the particular application, for example, clutches, may dictate a high concentration of ceramic and have no requirement for a lubricant.

The finished article, for practical purposes, may be a solid homogeneous mass or mixture of the various elements which is embodied in a flat, disc-shaped form for convenient assembly. The friction article may, in effect, be substituted for the conventional organic friction lining used in a brake or clutch for frictional engagement with a relatively rotatable member.

The source of mullite-producing ceramic and the amount thereof used in the present invention may vary somewhat depending upon the friction and wear properties desired. This material serves as the primary friction-producing ingredient and is preferably dispersed uniformly throughout the article.

Mullite is a mineral having a formula $3Al_2O_3 \cdot 2SiO_2$. Mullite may be formed by heating combinations of alumina ($Al_2O_3$) and silica ($SiO_2$) to about 1000° C. or higher. It crystallizes in the orthorhombic system and is characterized by lath or needle-like crystals having an almost square cross section. Mullite does not occur as a natural mineral in commercial quantities, but is customarily derived from other materials by heat treating processes which are fully explained hereafter.

Mullite is commonly derived for commercial use in one of two ways. The first method is to fuse the proper stoichiometric proportions of alumina and silica in an electric furnace. If the alumina and silica used in this process are of a high purity and the proper amounts are used, a pure form of mullite (containing less than 1% of other ingredients) can be obtained.

The second method is to calcine any one of three natural-occurring aluminum silicates at the proper temperature. These three minerals are commonly called: kyanite, sillimanite, and andalusite, and form a trimorphic series having the chemical formula $Al_2O_3 \cdot SiO_2$. When any of the minerals are heated to the proper temperature, mullite is formed according to the following reaction $3(Al_2O_3 \cdot SiO_2)$ plus Heat $= 3Al_2O_3 \cdot 2SiO_2$ plus $SiO_2$. The silica ($SiO_2$) liberated in this reaction is either a highly siliceous glass or a high temperature crystalline form of silica (cristobalite or tridymite) depending on the minor impurities of the raw material. It is, of course, desirable that the heat treating process be carried on under such circumstances that the conversion of the base material to mullite is as complete as the constituency of the raw material will allow.

Throughout this specification the terms "calcined kyanite," "calcined sillimanite" and "calcined andalusite" are used to indicate a heat-treated alumina-silica material in which mullite is predominant. Minor amounts of unconverted base material usually remain in the calcined alumina-silica material due to a non-uniform temperature distribution during the heat treating process.

Andalusite has a crystalline structure in the orthorhombic system and occurs in nature as a grey, greenish or reddish mineral with a specific gravity of 3.0 to 3.5. The largest domestic source is found in Mono County, California. Other deposits are rare, but some have been found in Nevada and New England. This material begins disassociation to mullite at 1410° C., and the mullite conversion is substantially complete at 1500° C. A slight expansion occurs when mullite is formed with little or no disintegrating or disruptive effect.

Kyanite has a crystalline structure in the triclinic system and has a specific gravity of 3.5 to 3.7. The most important deposits are found in Virginia, South Carolina, Georgia, and India. This substance begins disassociation to mullite at 1100° C., and the mullite conversion is substantially complete at 1410° C. This conversion is accompanied by an expansion of 10% which produces multiple fractures in the kyanite grain. The grain does not disintegrate, and this result is believed to be due to the bonding effect of the siliceous glass in which has developed a quantity of minute crystals of tridymite and/or cristobalite. While the percentage of mullite in the calcined kyanite varies, generally the proportion of the mullite therein is about 70% to 75% of the calcined kyanite; therefore, the approximate equivalent of 4% of the calcined kyanite is 3% of pure mullite. Pure calcined kyanite has a content of about 85% mullite.

Sillimanite has a crystal structure in the orthorhombic system and has a specific gravity of 3.23. Some sillimanite is found in South Dakota, but the best known deposits are in India. This material begins disassociation to mullite at 1550° C., and the mullite conversion is substantially complete at 1625° C., with little or no expansion taking place.

In all three forms of the foregoing natural-occurring materials, the formation of the mullite crystals starts on the surface of the raw-material grains. In andalusite grains, the mullite needles orient themselves parallel to the "C" or longitudinal axis of the original crystal. In kyanite and sillimanite, the mullite crystals grow inwardly in a direction perpendicular to the surface.

Other natural-occurring materials, such as topaz or clays having as their predominant constituents minerals of the kaolinite group or aluminous groups are available for making useful forms of mullite.

Typical compositions which may be used to produce a brake or clutch facing, or lining, are as follows (the percentages of the ingredients being by weight):

*Formula A*

| | Percent |
|---|---|
| Copper | 16 to 86 |
| Zinc and/or tin | 1 to 41 |
| Iron | 2 to 38 |
| Graphite | 2 to 19 |
| Calcined kyanite | 3 to 55 |

*Formula B*

| | |
|---|---|
| Copper | 27 to 68 |
| Zinc and/or tin | 2 to 32 |
| Iron | 3 to 30 |
| Quartz | 5 to 19 |
| Graphite | 1 to 13 |
| Calcined kyanite | 1 to 55 |

*Formula C*

| | |
|---|---|
| Copper | 16 to 86 |
| Zinc and/or tin | 1 to 41 |
| Iron | 1 to 30 |
| Lead | 1 to 20 |
| Quartz | 1 to 20 |
| Graphite | 1 to 13 |
| Calcined kyanite | 4 to 55 |

In conducting experiments directed toward increasing the percentage of mullite in our friction material, it was found that, with copper as the sole matrix ingredient, a cohesive and functionally superior friction material can be obtained with percentages of calcined kyanite or pure mullite substantially above 55%. For example, the following formulations have given satisfactory test results:

*Formula D*

| | Percent |
|---|---|
| Copper | 40.0 |
| Calcined kyanite | 60.0 |

*Formula E*

| | |
|---|---|
| Copper | 30.0 |
| Calcined kyanite | 70.0 |

*Formula F*

| | |
|---|---|
| Copper | 35.0 |
| Relatively pure mullite | 65.0 |

Although the use of copper as the sole matrix ingredient has been mentioned as an expedient which permits the inclusion of a higher percentage of calcined kyanite or pure mullite in the friction material, there are undoubtedly other matrix constituencies whcih would be as effective as, or more effective than, copper in increasing the amount of the ceramic material which can successfully be included in the composition. Experience which has been accumulated in the development of matrix materials indicates that future efforts should continue the trend toward increasing the usable upper limits of the ceramic friction producing ingredient.

The matrix ingredients are also selected on the basis of heat resistivity requirements for the finished material. Where exceedingly high temperatures are encountered, more refractory, higher melting point metals, such as iron, nickel, and cobalt may be substituted for lower melting point metals, such as copper. Examples of such formulations are as follows:

*Formula G*

| | Percent |
|---|---|
| Nickel | 57 |
| Monel (nickel 68% to 70%, copper 28% to 30%, silicon 2% to 3%) | 5 |
| Silica | 5 |
| Graphite | 3 |
| Calcined kyanite | 30 |

*Formula H*

| | |
|---|---|
| Cobalt | 65 |
| Silica | 5 |
| Graphite | 10 |
| Calcined kyanite | 20 |

*Formula I*

| | |
|---|---|
| Iron | 75 |
| Silica | 5 |
| Calcined kyanite | 20 |

The friction articles produced by following the foregoing formulations possess frictional properties and wear-resistance which suit them for use in various types of kinetic-energy-absorbing devices. Even though extremely high frictional heats are developed, the coefficient of friction of the articles is maintained at a satisfactory and stable level throughout the wear-life of the articles. The friction and wear properties may be varied, for example, by varying the quantity of calcined kyanite. Therefore, the amount to be used will depend upon design needs, It has been noted in the use of friction compositions which incorporate, as the primary friction-producing ingredient, strong abrasives such as silica, aluminum oxide, etc., that after a relatively few braking stops in which high temperatures are generated, the braking effectiveness diminishes. This reduction is believed to be due to the fact that the abrasives become fire polished at the high heats encountered, thereby substantially impairing the frictional characteristics thereof.

Heretofore, it has been considered necessary that inorganic friction compositions contain strong abrasive materials, i.e., the abrasive crystals or grains be comparatively strong and resistant to breakage under service usage. This being true, repeated braking applications which generate high friction surface temperatures do not break or fracture the grains which, therefore, tend to become "fire polished" or smoothed, thereby seriously affecting the friction properties.

In contrast with this common belief in the art, the present invention incorporates a relatively weak and friable friction constituent in the form of mullite or the aforementioned mullite-bearing materials. The mullite provides a wear surface of frangible apices extending outwardly from the face of the friction article. When fractured (or worn) these apices reform into multiples of the original apices, thereby always presenting a friction surface having a desirably high coefficient of friction. In actual aircraft brake tests in which friction surface temperatures are believed to reach 1650° C. (3000° F.), the grains of the friction-producing mullite do not appear to fire polish but rather to fracture and produce more pointed grains without formation of a glassy phase.

The following formulations are listed as specific examples of friction linings usable in heavy duty kinetic-energy-absorbing devices. Of these formulae, J and K represent preferred versions of our friction material. Formula J being an example of an excellent lining having a relatively small amount of mullite, and Formula K being an example of an excellent lining having a considerably higher concentration of mullite. The percentages given are by weight.

Formula J

| | Percent |
|---|---|
| Copper | 66 |
| Zinc | 12 |
| Tin | 6 |
| Iron | 6 |
| Graphite | 6 |
| Calcined kyanite | 4 |

Formula K

| | |
|---|---|
| Copper-lead (same as in Formula L) | 68 |
| Quartz | 5 |
| Graphite | 1 |
| Calcined kyanite | 26 |

Formula L

| | |
|---|---|
| Brass chips | 29 |
| Copper-lead | [1] 39 |
| Quartz | 5 |
| Graphite | 1 |
| Calcined kyanite | 26 |

[1] (This material in raw state is atomized copper-lead powder in the proportion of 65 parts copper to 35 parts lead and will pass through a 200 mesh screen.)

Formula M

| | |
|---|---|
| Copper | 30.00 |
| Tin | 11.18 |
| Zinc | 22.32 |
| Iron | 22.32 |
| Graphite | 11.18 |
| Relatively pure mullite | 3.00 |

Formula N

| | Percent |
|---|---|
| Copper | 62 |
| Zinc | 12 |
| Tin | 6 |
| Iron | 7 |
| Graphite | 6 |
| Relatively pure mullite | 7 |

Formula O

| | |
|---|---|
| Copper | 61 |
| Zinc | 12 |
| Tin | 6 |
| Iron | 8 |
| Graphite | 6 |
| Calcined andalusite | 7 |

Formula P

| | |
|---|---|
| Copper | 61 |
| Zinc | 12 |
| Tin | 6 |
| Iron | 8 |
| Graphite | 6 |
| Calcined sillimanite | 7 |

In general, our improved friction material is produced from finely divided or powdered ingredients which are thoroughly mixed to a homogeneous mass and then compacted either in a shallow retaining cup or a suitable die under a relatively high pressure. The compacting pressure may be allowed to dwell on the compact for a period of time, such as thirty (30) seconds. The compact, if made in a die, may be inserted into a reinforcing cup either before or after sintering. In any event, the material is sintered in such a manner as to cause alloying or coalescing of the metal powders, thereby forming a highly porous metallic matrix with the other materials dispersed throughout the matrix and firmly secured in place in the various pores. The finished product is then a composite of the ingredients joined through various degrees of physical combinations, and is characterized as a compact, self-supporting unit or lining.

The ingredients mixed together may have particle sizes approximating the following: copper through 325 mesh, iron through 200 mesh, zinc about 150 mesh, tin through 325 mesh, calcined kyanite through 10 mesh, mullite through 10 mesh, quartz about 140 mesh, lead about 100 mesh, graphite (natural flake graphite), and brass chips through 10 mesh and on 100 mesh. These sizes may be varied considerably depending upon design desiderata; however, it has been found that the ideal grain size for the calcined kyanite is 40 to 60 mesh. The degree of purity of the ingredients may also be considerably varied in accordance with design preferences as will be mentioned hereafter in an explanation of how the present lining may be compounded.

In processing, these ingredients are thoroughly mixed to obtain a homogeneous mixture. This operation may be conveniently accomplished by the use of a cone blender which is allowed to run for approximately one-half hour or more.

Figure 2:
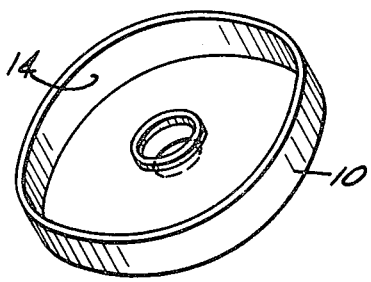
Figure 2 is a perspective illustration of the supporting element of Figure 1.

This resultant mix may be compacted into substantially solid form, and at least two methods for making a compact are available. In the first method, the material may be compressed into a shallow cup-shaped support 10 of Figure 2 of the attached drawing. The cup-shaped support 10 is formed of cold rolled steel and copper plated to a thickness of approximately 0.0005 inch to 0.001 inch, the actual thickness not being critical but sufficient to serve the purpose hereinafter described. This copper-plated cup is then placed into an intimately fitting die and a measured amount of mix poured therein and smoothed over to provide fairly uniform thickness and density throughout the powdered mass. Next a suitable flat-faced plunger is brought to bear on the exposed powder surface with a pressure of about 40,000 to 100,000 pounds per square inch, thereby compacting the material into the cup.

The compacted product now obtained is a unified mass of controlled porosity and density retained in substantially solid form by means of the pressure and intimate contact between the ingredient particles.

Next the compact is sintered, preferably in a reducing atmosphere, at a temperature of approximately 1100° F. to 1900° F. for a period of about twenty minutes to one and one-half hours. The reducing atmosphere prevents oxidation in the mass and makes possible metal-to-metal contact of the various metal particles to facilitate coalescence or secure adherence of such particles together. This result is believed to occur by reason of the chemical combination of the reducing atmosphere with the metal oxides, thereby leaving pure metal surfaces in direct cohesive and/or adhesive contact. The sintering temperature must, of course, be kept below the melting point of the copper or other predominant metal since it has been found that once the metal flows, it separates from the other ingredients. The purpose of sintering is to keep the metal particles in substantially the same relative compacted physical positions, but at the same time cause direct coalescence therebetween to form an integral metal-alloy mass or matrix having irregularly dispersed pores which are filled with the other compact ingredients. Coalescence or alloying is facilitated by the use of zinc and tin, which in melting wet the particles of copper and promote alloying. The resultant porous matrix serves as a mechanical binder for securing the various non-metallic or non-alloying particles in place.

It should be here stated that there are two reasons for copper plating the retaining cup, the first being to provide an interface between the cup and compact which serves as a joining or bonding medium therebetween in brazing the two bodies together. This interface is shown as the dark line 12 in Figure 3 and under microscopic examination blends into the materials of both bodies. This bond, in conjunction with the forces of friction between the compact and cup sides 14, rigidly secures the parts together. The cup sides provide appreciable lateral support against the compact shearing away during a service application. Further, as the second of the above-mentioned two reasons, the copper plate protects the cup from decarbonizing or oxidizing during the sintering operation, both or either of these two reactions, if allowed to occur, serving to weaken the bond between the cup and compact.

Figure 3:
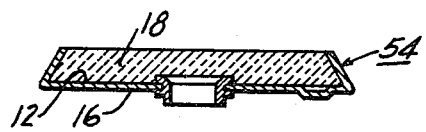
Figure 3 is a cross-section of a slightly different embodiment from that shown in Figure 1.

As mentioned earlier, there are two methods by which our improved friction material may be produced, the one just described being generally to compact the powders into the retaining cup, then sintering. As the second method, instead of compacting in the cup proper, a die having a concavity substantially the equal of the cup is used to receive the powders which are therein compacted and after removal in compact form, sintered under substantially the same conditions as before. However, the resultant article is formed with a bevelled peripheral surface at an angle of about 75 degrees to the bottom face. Next the compact is placed in a cup (not necessarily copper plated) and a coining operation performed thereon during which the cup sides are forced against the peripheral surface of the compact. Thus, as seen in Figure 3, a mechanical clamping arrangement is provided for securing the assembly together. The coining operation develops substantial axial pressure on the compact and cup so as to fill out any voids which may occur between the cup and compact or in the compact itself, and to bring the thickness of the over-all assembly within tolerance dimensions.

The article as illustrated in the drawings may conveniently be incorporated in a disc brake as disclosed in Du Bois et al. Patent 2,483,362. A mere substitution of the article for the Du Bois et al. patent "friction material" is all that is necessary, and this may be accomplished by fastening the bottom 16 of the compact of Figure 3, by welding or the like, to one of the nonrotatable discs so that the friction face 18 is juxtaposed with one of the rotatable brake discs. Generally speaking, wherever an organic friction lining segment is used in disc brakes, an article of this invention may be substituted therefor. In certain instances, slight design changes may be necessary in the brake to accommodate the new form of article.

In illustration of how the present invention may be adapted for use in an aircraft brake, reference is made to Figure 4 for an illustration of such adaptation, the brake of this figure being closely similar to the one illustrated and claimed in Du Bois et al. Patent 2,483,362. In this figure, a wheel 20 is rotatably supported on axle 22 by means of bearings 24. This wheel is provided with an overhanging rim portion 26 which is equipped with a plurality of driving keys 28, said keys extending axially through peripheral slots 29 in rotatable discs 30, 32, 34, and 36 to drive the same. The number of rotating discs may be varied according to the requirements of the particular brake installation. These discs are movable axially along the driving keys 28 for frictional contact with the cooperating nonrotating disc members of the brake structure.

These nonrotating disc members are supported on a fixed member 38, which is suitably secured to axle 22. The member 38 has a nonrotatable and axially fixed disc 40 held thereon by means of a plurality of through bolts 42. Sleeves 44 are mounted on the bolts 42 and serve as anchors for four axially movable but nonrotatable discs 46, 48, 50, and 52. Both sides of discs 48, 50, and 52 are provided with the friction articles or compacts 54 made according to the foregoing explanation of this invention. Also, the left face of disc 40 and the right face of disc 46 are provided with compacts 54. These compacts 54 may be used in any desired number, and as illustrated are used in sufficient number to be equally spaced about the circumferential extents of the discs.

The actuating means for exerting compressive force on the brake discs comprises a piston 56 which is movable axially within a chamber 58 provided in the member 38. The piston 56 and its associated chamber 58 are, in the present instance, O-shaped.

Any means may be used to fasten the compacts 54 to the corresponding discs, and as illustrated, a rivet-type fastening is used. Whatever type of connection is used, it is essential that it be of sufficient strength to retain the compact on the respective disc during the extreme shear loads produced by braking applications. Thus, it is possible that the bottom of the compact cups may be welded by means of a convenient process to the disc members.

In operation, fluid under pressure is introduced into chamber 58 to drive piston 56 toward the right. Piston 56 then forcibly engages nonrotatable disc 46 and thereby compresses all of the discs into frictional interengagement against the backing member 40. For release of the brakes, the fluid pressure introduced into chamber 58 is relieved, thereby allowing disengagement of the disc members. During frictional engagement of the discs, the friction faces 18 of compacts 54 directly engage the rotating discs 30, 32, 34, and 36, respectively, so as to produce the desired braking torque.

Figure 5:
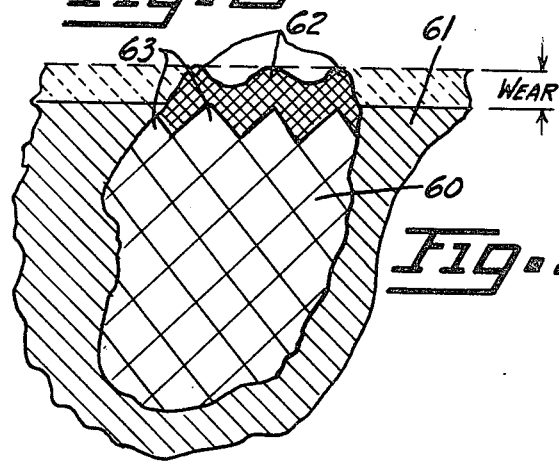
Figure 5 is a broken, greatly enlarged, sectional detail view, showing a grain containing mullite crystals retained by a metallic binder for a friction-producing function and also showing the grain presenting new frictional surfaces after wear.

In the illustration given in Figure 5, 60 designates a grain of mullite or calcined kyanite, the grain being formed at least principally of mullite crystals, and 61 designates the metallic binder retaining the grain in place for friction-producing action. The original apices of the grain are indicated by the numeral 62. Under the braking or clutching operation, the apices 62 are broken away and renewed so that new frictional apices 63 are formed; thus, as the composition wears in actual operation, new irregular or pointed surfaces are provided to continue the friction-producing operation. This characteristic of the mullite crystal in fracturing under wearing stress so as to present new apices is believed to account for the desirable results described.

In the use of the present invention, it has been found that even with extended heavy duty use, the coefficient of friction of the article will remain relatively constant throughout the wear-life thereof, and in some cases will actually increase slightly as wear progresses. Stated in other words, there is generally no tendency toward a deteriorating coefficient of friction as in the use of prior art friction articles.

The terms "friction article" and "friction composition" as used herein mean and include, and are intended to mean and include, friction segments or lining having use in brakes, clutches, or the like devices, as one part of the principal friction-producing elements of the devices. For example, the composition of the present invention could be used as lining for the brake shoes in the conventional automotive vehicle drum brake assemblies or as linings on friction elements of disc brakes. Of course, the means by which the actual friction-producing product of this invention may be fastened in the clutch or brake assemblies may vary to suit design requirements.

The numerous specific formulations cited in this specification are merely examples of useful combinations of ingredients, and are not intended to detract from the breadth of the concept that constitutes applicants' invention, i.e., the concept that an improved friction material can be provided by combining suitable amounts of mullite and a metallic binder.

Although several embodiments of the invention have been illustrated and described, various changes in the form and relative arrangements of the parts or ingredients may be made to suit requirements.

We claim:

1. In a process for forming a clutch or brake friction article, the steps of calcining kyanite to form mullite in excess of 70% by weight of the kyanite, mixing the calcined kyanite material with a metal powder which is deformable under pressure to flow around said mullite and mechanically grip said kyanite material, compressing the mixture to a unified mass, sintering the mass in a protective atmosphere at a temperature of 1100 to 1900° F. to unit the metal particles, and subjecting the united mass to pressures from 40,000 to 100,000 p.s.i. to fill out the voids therein while confining said mass against lateral expansion.

2. The process of claim 1, in which the sintering step is carried out in a reducing atmosphere.

3. The process of claim 1, in which silica is added to the friction material.

4. The process of claim 1, in which the sintering operation is carried on within a period of 20 minutes to one and one-half hours.

5. In a process for forming a clutch or brake friction article, the steps of calcining kyanite at a temperature between approximately 1100 and 1410° C. to form mullite in excess by weight of 70% of the calcined kyanite material, mixing the calcined material with metal powder which is deformable under pressure to flow about said calcined kyanite material and provide a rigid mechanical interlocking therefor, compressing the material into a rigid compact, and heating the compact to coalesce and thereby adhere the metal particles and thereby bind the mullite during the wear life of the friction composition, said heating being effected so that the structure of the metal powders coalesce in substantially their original position and without aggregating relatively to the other ingredients.

6. In a process for forming an integrated cup and friction composition article suitable for use in a brake or clutch, the steps of mixing deformable metal powder and an alumina-silica material containing mullite as the prime friction ingredient, said metal powder being deformable under pressure to mechanically grip said alumina-silica material, said mullite being in excess of 3% by weight of the composition, compressing the mixture to form a rigid compact, sintering the mixture at a temperature of 1100 to 1900° F. to unite the metal particles, compressing the compact within said retainer cup to fill out the voids between said compact and said cup, and pressing the walls of the cup into interlocking engagement with said compact.

7. In a process for forming a clutch or brake friction article, the steps of heating alumina-silica material to form mullite in excess of 70% by weight of said material, crushing the said heated material and sizing said crushed material so as to pass through a 10 to 60 mesh screen, mixing the material with a metal powder which deforms under pressure to mechanically grip said alumina-silica material, compacting the mixture of metal powder and alumina-silica material, sintering the metal powder about said mullite material to unite said metal particles, and subjecting the mass to pressures of 40,000 to 100,000 p.s.i.

8. The method of claim 5, in which the sintered composition is compressed under pressures of 40,000 to 100,000 p.s.i. while confining the composition against lateral expansion.

References Cited in the file of this patent

UNITED STATES PATENTS

| 542,414 | Kinzer | July 9, 1895 |
| 2,784,105 | Stedman et al. | Mar. 5, 1957 |